United States Patent [19]

Mayr et al.

[11] 4,288,168
[45] Sep. 8, 1981

[54] ARRANGEMENT FOR DRIVING A PRINTER CARRIAGE IN TELETYPEWRITERS OR DATA PRINTERS

[75] Inventors: Ulrich Mayr, Germering; Dietmar Höreth; Hans Kusmierz, both of Munich, all of Fed. Rep. of Germany

[73] Assignee: Siemens Aktiengesellschaft, Berlin & Munich, Fed. Rep. of Germany

[21] Appl. No.: 47,767

[22] Filed: Jun. 12, 1979

[30] Foreign Application Priority Data

Jun. 12, 1978 [DE] Fed. Rep. of Germany ....... 2825761

[51] Int. Cl.³ .............................................. B41J 19/30
[52] U.S. Cl. ................................... 400/322; 400/323; 310/112; 318/696
[58] Field of Search ............................. 400/320–323; 310/112, 114; 318/696, 112

[56] References Cited

U.S. PATENT DOCUMENTS

| | | | |
|---|---|---|---|
| 3,225,233 | 12/1965 | Kirilouckas | 310/112 |
| 3,888,403 | 6/1975 | Yoshida et al. | 310/114 |
| 3,911,301 | 10/1975 | Riley | 310/114 |
| 4,000,804 | 1/1977 | Zaltieri | 400/234 |
| 4,065,685 | 12/1977 | Newell | 310/112 |
| 4,076,111 | 2/1978 | Robinson et al. | 400/322 |
| 4,157,671 | 6/1979 | Goldhammer | 318/112 |
| 4,203,679 | 5/1980 | Duerr et al. | 400/322 |

FOREIGN PATENT DOCUMENTS

| | | | |
|---|---|---|---|
| 1947580 | 3/1971 | Fed. Rep. of Germany | 400/320 |
| 2537511 | 2/1977 | Fed. Rep. of Germany | 400/322 |
| 2743896 | 6/1978 | Fed. Rep. of Germany | 400/322 |

OTHER PUBLICATIONS

Chai et al., "Twin Stepper Motors", IBM Technical Disclosure Bulletin, vol. 15, No. 11, p. 3402, 4/73.
Abbott et al., "Tensioning Device", IBM Technical Disclosure Bulletin, vol. 8, No. 10, p. 1425, 3/66.

Primary Examiner—William Pieprz
Attorney, Agent, or Firm—Hill, Van Santen, Steadman, Chiara & Simpson

[57] ABSTRACT

An arrangement for the drive of a printer carriage in teletypewriters or data printers in which pliable drawing means secured to the printer carriage is simultaneously driven by two drive motors. The drive motors are of identical design and cooperate with drive guide rollers arranged exteriorly of the printing area. Stepping motors preferably are employed as the drive motors and arranged with a displacement by half a step and can be alternately driven, so that one of the two stepping motors always functions in optimum torque range.

9 Claims, 3 Drawing Figures

ARRANGEMENT FOR DRIVING A PRINTER CARRIAGE IN TELETYPEWRITERS OR DATA PRINTERS

BACKGROUND OF THE INVENTION

The invention relates to an arrangement for the drive of a printer carriage in teletypewriters or data printers in which a printing head is disposed for movement along a line relative to a platen, and in which the movement of the printer carriage is effected by a driven, pliable drawing means.

As illustrated in German OS No. 25 37 511, it is known to move the printer carriage of a teletypewriter or data printer by suitable pliable drawing means, both for the forward, character-printing movement as well as for the return movement. The pliable drawing means may, for example, comprise a toothed belt driven by means of a drive motor which, advantageously, can be designed as a stepping motor.

Where the printer carriage is driven by a single drive motor, utilizing a continuous drawing member, considerable differences occur in the effective length of the tensioned drawing member. Such difference depends upon the momentary position of the printer carriage, and the direction of movement of the drive motor and drawing means. As a result of such different lengths, the natural frequency of the spring-mass system comprising the mass of the printer carriage and the spring constant of the drawing means is subject to large fluctuations.

BRIEF SUMMARY OF THE INVENTION

The present invention therefore has as a particular objective, the provision of an arrangement for the drive of such a printer carriage, in which only relatively minor fluctuations of the natural frequency of the drive system occur during movement of the printer carriage in either direction along the printing line.

This objective is achieved, in a drive arrangement of the type initially referred to, by the employment of two drive motors, disposed at opposite sides of the printer carriage in the line direction, which simultaneously drive the pliable drawing means.

The arrangement has the advantage that in place of a single large drive motor, two smaller drive motors can be employed whose heat-dissipating characteristics, for example heat-dissipating surface is greater than that of a single drive motor of equal power. The arrangement has the further advantage that the load transmission to the printer carriage is always derived over a short section of the drawing means, which is smaller than half of the length of such drawing means. Both in forward or reverse direction, and both upon acceleration as well as deceleration, the drawing means remains tensioned over its entire length and vibrations of the drawing means are to a large extent avoided. As a result of the employment of two drive motors, the vibration characteristics of the arrangement is the same irrespective of the direction of movement of the printer carriage, so that the drawing means is loaded in the same manner, both when printing in the forward direction as well as in the reverse direction which may also be a printing movement, and thus the vibration characteristics of the drive system does not change.

A further advantage of the arrangement resides in that the double torque of a stepping motor is available at only double the rotor moment of intertia. A correspondingly larger stepping motor with equivalent properties cannot, from a practical standpoint, be manufactured.

A particularly advantageous arrangement is achieved by disposing the drive motors at the guide locations of the drawing means, for example, driving guide rollers provided thereat.

A further advantageous feature of the arrangement is derived when the drive motors are of like design, and in particular when the drive motors are designed as stepping motors.

The same control unit normally employed with a single drive motor can be utilized for simultaneously actuating both drive motors.

When stepping motors are employed as the drive motors, it is particularly advantageous that the stepping motors be so arranged that they are operatively displaced by half a step, and are alternately driven. It thereby can be achieved with such an arrangement that one of the two stepping motors is always operating in its optimum torque range. Likewise, by means of the displacement by half a step, a multiplication of 1:2 is achieved. Consequently, different writing positions can be assumed by the printing carriage without requiring additional gearing or transmission stages.

Advantageously, in order to permit a lower thermal loading, it is favorable, during operating pauses, to distribute a predetermined holding current to both stepping motors, or to permit one of the stepping motors to be switched to idle during such a pause.

BRIEF DESCRIPTION OF THE DRAWINGS

In the drawings which illustrate an exemplary embodiment of the invention.

DETAILED DESCRIPTION

Figure 1:
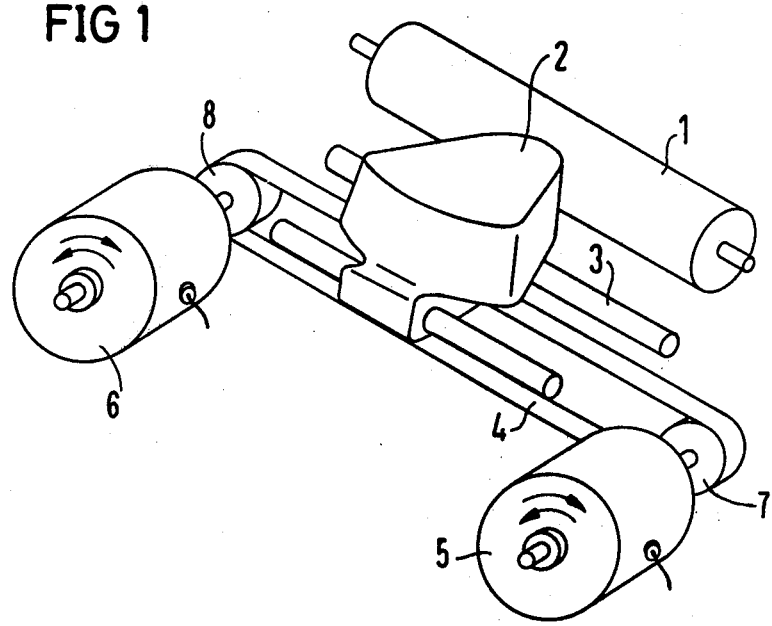
FIG. 1 is a perspective view illustrating an arrangement, in accordance with the invention, utilizing two drive motors for the drive of a printer carriage.

Referring to FIG. 1, a printer carriage 2 is supported on a pair of tracks 3, for movement therealong in operative position front of a platen 1, which is supported for rotation in the housing of the teletypewriter or data printer, but is fixed with respect to axial movement, and is adapted to support a sheet-like or tape-like recording medium and guide the same whereby the latter can be written on line-by-line. During the writing operation, the step-wise drive of the printer carriage 2 along the writing line is effected by means of pliable drawing means 4, for example a continuous toothed belt, having its ends suitably secured to the carriage 2. The drawing means 4 is adapted to be operatively driven by means of two drive motors 5 and 6 which, for example, are designed as stepping motors and are capable of moving the printer carriage 2 into the exact positions required for the printing operation. The drive motors 5 and 6 are arranged at the locations of the guide means for the belt, which in the embodiment illustrated are in the form of respective guide rollers 7 and 8 and which form the drive means for the belt. The printing of characters on the recording medium can take place in both directions along the recording line, and likewise by means of the two drive motors 5 and 6 a return of the printer carriage 2 into an initial position can be achieved.

The drive motors 5 and 6 can be driven by means of a suitable control unit, not illustrated, which can be of the same design as that employed in an arrangement utilizing only a single drive motor. In such case, the two cooperable drive motors would be simultaneously driven by means of the same control signals.

In the event stepping motors are employed as the drive motors 5 and 6, these can be suitably arranged with an operative displacement of half a step, and can be so driven that one of the two drive motors 5 and 6 is alternately in the optimum magnetic lock-in position. This method of operating two stepping motors is known per se and is described, for example in German LP 21 29 908, in conjunction with two stepping motors which are arranged on a common drive shaft.

In order to achieve higher thermal safeguards, one of the two drive motors 5 and 6 can be switched to an idle condition during the working pauses.

Figure 2:
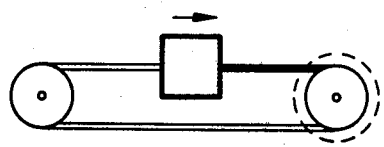
FIG. 2 is a schematic representation of the loading of a pliable drawing means in a known arrangement utilizing one drive motor.
Figure 2:
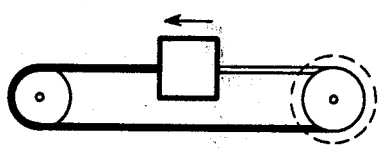

FIG. 2 illustrates the loading of a pliable drawing means 4 in a known arrangement, utilizing only a single drive motor 5. In this case, the drawing means 4 is tensioned over the two guide rollers 7 and 8, of which only the guide roller 7 is directly driven by the drive motor 5 or other suitable transmission means. In the arrangement illustrated, the drawing means 4 is positively connected with the guide roller 7, for example by utilizing a toothed belt as the drawing means. In a servo drive, in which the motion pick-up is, for example, allocated to the printer carriage, a non-positive connection with the guide rollers would be sufficient. The printer carriage 2 thus is connected to the drawing means between the guide rollers 7 and 8.

In the upper portion of FIG. 2, it is assumed that the printer carriage is to be moved from left to right and to be accelerated. With the utilization of a single drive motor 5, only the short section of the drawing means 4 extending between the guide roller 7 and the printer carriage 2 is tensioned, which loading is represented in the drawing by means of a heavy black line. In the lower portion of FIG. 2, it is likewise assumed that the movement of printer carriage 2 is from left to right, but that that carriage is to be decelerated. In this case, a relatively long section of the drawing means 4 is tensioned, which tensioned section extends from the printer carriage 2 over the guide roller 8 up to the driven guide roller 7. This section corresponds to almost the entire length of the drawing means 4 when the printer carriage 2 is located in its closest proximity to the guide roller 7. In contrast thereto, as illustrated in the upper portion of FIG. 2, the tensioned section of the drawing means 4 is very small at the same position of the printer carriage. The natural frequency of the spring-mass system formed from the mass of the printer carriage 2 and the spring constant of the drawing means 4 is therefore subject to large fluctuations.

Figure 3:
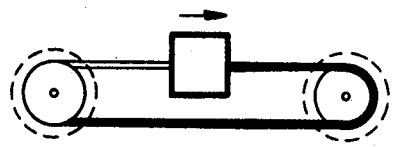
FIG. 3 is a similar schematic representation of the loading of the drawing means in an arrangement utilizing two drive motors in accordance with the invention.
Figure 3:
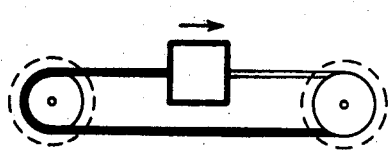

In the schematic illustration of FIG. 3, corresponding to that of FIG. 1, a second drive motor 6 is provided at the guide roller 8 with the drawing means 4 always being simultaneously driven by means of both drive motors 5 and 6.

In the upper portion of FIG. 3, as in the upper portion of FIG. 2, it is assumed that the printer carriage 2 is to be moved from left to right and to be accelerated. Since both drive motors 5 and 6 drive the drawing means 4, the latter is tensioned in that portion of its length extending between the printer carriage 2, the guide roller 7 and the guide roller 8. Likewise, in the lower portion of FIG. 3, corresponding to the lower portion of FIG. 2, it is assumed that movement of the printer carriage 2 is similarly from left to right and decelerated. In this case, the drawing means 4 is tensioned along its length between the printer carriage 2, the guide roller 8 and the guide roller 7.

As will be apparent from FIG. 3, the differences between the tensioned length of the drawing means 4 during both acceleration and deceleration are significantly less in the drive employing two drive motors 5 and 6, than in a drive employing merely a single drive motor. It will therefore be appreciated that with the present invention, the natural frequency of the drive system changes only slightly as a function of the position of the printer carriage 2 along the printing line.

Likewise, it will be noted that where the printing head is arranged on the printer carriage 2 for printing both during forward as well as reverse direction along the printing line, an identical vibration behaviour results in both printing directions, by the employment of the two drive motors 5 and 6.

Although we have described our invention by reference to particular illustrative embodiments thereof, many changes and modifications of the invention may be apparent to those skilled in the art without departing from the spirit and scope of the invention. We therefore intend to include within the patent warranted hereon all such changes and modifications as may reasonably and properly be included within the scope of our contribution to the art.

We claim as our invention:

1. In an arrangement for the drive of a printer carriage in teletypewriters or teleprinters, the combination of a platen for supporting a recording medium, a printer carriage disposed for movement relative to the platen and carrying a printing head, a pair of drive motors of identical design, each disposed adjacent opposite sides of the carriage in the direction of travel thereof, and pliable drawing means operatively connecting said carriage and said motors, whereby said motors are always simultaneously driven by means of identical control signals during the transport of said carriage and head on said pliable drawing means.

2. An arrangement according to claim 1 wherein said drive motors are stepping motors.

3. An arrangement according to claim 1, wherein said drive motors are arranged at the guide locations of the drawing means, and drive respective guide rollers disposed thereat.

4. An arrangement according to claim 3 wherein said drive motors are stepping motors.

5. An arrangement according to claim 4 wherein a predetermined holding current is supplied to each stepping motor during operational pauses.

6. An arrangement according to claim 4, wherein current to one of the stepping motors is switched off during operational pauses.

7. An arrangement according to claim 4, wherein stepping motors are operated with a relative displacement of half a step therebetween.

8. An arrangement according to claim 7, wherein a predetermined holding current is supplied to each stepping motor during operation pauses.

9. An arrangement according to claim 7, wherein current to one of the stepping motors is switched off during operational pauses.

* * * * *